United States Patent [19]

Schroeder et al.

[11] 4,321,077
[45] Mar. 23, 1982

[54] METHOD OF PREPARATION OF MULTICOMPONENT FERTILIZERS

[75] Inventors: Jerzy Schroeder; Henryk Górecki, both of Wrocław; Mieczysław Lewandowski, Szczecin; Adam Pawelczyk, Wrocław; Antoni Kuzko, Szczecin, all of Poland

[73] Assignee: Politechnika Wrocławska, Wroclaw, Poland

[21] Appl. No.: 136,527

[22] Filed: Apr. 2, 1980

[30] Foreign Application Priority Data

Jun. 27, 1979 [PL] Poland .................................. 216704

[51] Int. Cl.$^3$ ............................................ C05B 11/08
[52] U.S. Cl. ........................................ 71/40; 71/53; 71/64.04; 71/64.08
[58] Field of Search .................. 71/33, 40, 42, 43, 47, 71/50, 53, 64 B, 64 C, 64 DC, 64.1, 64.4, 64.8, 64.10; 423/167, 308, 309, 311, 312, 319, 320, 635

[56] References Cited

U.S. PATENT DOCUMENTS

| | | | |
|---|---|---|---|
| 3,928,016 | 12/1975 | Michel | 71/42 |
| 4,007,030 | 2/1977 | Schroeder et al. | 71/47 X |
| 4,044,107 | 8/1977 | Houghtaling | 423/320 |
| 4,108,957 | 8/1978 | Michel | 423/3 |
| 4,183,738 | 1/1980 | Carmon | 71/53 X |

OTHER PUBLICATIONS

Phosphoric Acid, Slack et al., 1976, pp. 173-178.

Primary Examiner—S. Leon Bashore
Assistant Examiner—Ferris H. Lander

[57] ABSTRACT

The subject of the invention is the method of preparation of multicomponent fertilizers based upon the decomposition process of mineral phosphate material by ammonium sulphate and sulphuric acid. This method has application in chemical industry.

The invention concerns the method of preparation of multicomponent fertilizers relying upon the decomposition of mineral phosphate material by sulphuric acid and ammonium sulphate. The basis of the method relies upon the mineral phosphate material undergoing wet milling with the acid and sulfate and as a result of which mechanically-induced chemical processes occur the decomposition of the apatite structure of material takes place. The milled mixture is introduced into reactors-crystallizers, where further decomposition of the phosphate material and phosphate gypsum crystallization takes place.

The reactive pulp is filtered off and phosphate gypsum after counter-current washing is directed to prepare processing for chalk and recover ammonium sulphate solution, part of which latter is used for counter-current washing of sulphate gypsum. The washing liquor is introduced to the process of fertilizer preparation; the remaining part of the sulfate solution in quantity of 30 to 70% of total amount is re-introduced to the initial wet milling process of the phosphate material.

It is also possible to introduce to the reaction system the solution of ammonium sulphate, being a waste in other technologies like caprolactam, titanium white or acrylonitrile.

In the variant of the method of multicomponent NPK fertilizers preparation, mineral phosphate material undergoes wet milling in solution of ammonium sulphate and sulphuric acid with maintaining the weight ratio of sulphuric ion to acid within the range from 0.35 to 1.2 and the weight ratio of phosphate material to sulphate ion from 0.9 to 1.5.

To the milled suspension inorganic compounds containing nitrogen and potassium in quantity of 80 to 120% w/w in relation to phosphate material are added, yielding after granulation and drying complex NPK fertilizer.

3 Claims, No Drawings

METHOD OF PREPARATION OF MULTICOMPONENT FERTILIZERS

The subject of the invention is the method of preparation of multicomponent fertilizers based upon the process of mineral phosphate material decomposition by ammonium sulphate and sulphuric acid. This method is applicable in chemical industry.

The methods of preparation of extractive phosphoric acid, known from monographs: A. V. Slack "Phosphoric Acid", 1968, M. Dekker—New York, M. E. Pozin "Technologia mineralnych solej", M. E. Pozin "Technologia mineralnych udobrenii"—Izdatelstvo"-Chimia", Leningrad 1970, Kopylev "fosfornaya kislota"—Izdatelstvo"Chimia", Leningrad 1972, rely upon the decomposition of mineral phosphate material with sulphuric acid. In this process the solution of extractive phosphoric acid of concentration 28 to 30% w/w of $P_2O_5$ is formed and phosphate gypsum crystallizes, containing mostly calcium sulphate dihydrate. The sediment after filtration and washing is transported to stockyards. Filtered, extractive phosphoric acid undergoes concentration, neutralisation with ammonia and after introducing to such mixture potassium salts after granulation and drying, the multicomponent NPK fertilizers are obtained.

The phosphoric acid yield of the process defined by the quotient of the $P_2O_5$ mass in the product to $P_2O_5$ mass introduced to the process as the mineral phosphate material is dependent to large extent on the degree of the phosphate material decomposition, therefore the amount of undissolved phosphate material remaining in phosphate gypsum. If the utilisation of phosphate gypsum is performed in installations connected in line with the installation for obtaining extractive phosphoric acid, in every case the amount of $P_2O_5$ in phosphate gypsum deteriorates the properties of products and moreover makes more difficult the operation of the process.

The contents of undissolved phosphate material depends mostly on the reactivity of phosphate material, specific surface development of the sediment which is related to the degree of granules disintegration.

Prevailing number of mineral phosphate materials—mostly of sediment origin require mechanical disintegration. There are known and applied methods for dry milling phosphate material in ball mills, rod mills or vibrating mills. The process of milling requires expenditure of considerable amount of energy (about 0.9 GJ) per ton (metric) of $P_2O_5$, rising besides that a row of inconveniences, which make the run of the decomposition process more difficult. Non-uniform dispensing of the milled material which is susceptable to lumping rises a row of trouble occurring in form of perturbations in processes of decomposition and crystallisation, because the swing in the level of concentration of $SO_4^{2-}$ and $P_2O_5$ may cause blocking of the surface of the phosphate material by an envelope of calcium sulphate, therefore stopping further decomposition of its granules. The considerable obstacle is of dustiness which causes environment pollution on one hand and on the other—considerable loss of $P_2O_5$.

Countering such effects is possible with application of costful transportation systems and dust removal facilities.

There is, known from Polish patent description No. 95,554 the method of decay of phosphate material based upon the dihydrate method. In this method the mineral phosphate material undergoes in continuous manner the decomposition by sulphuric acid solution and filtration wahings containing phosphate ion, in presence of ammonium ions of concentration 0.2 to 0.5% w/w, in respect to nitrogen.

Ammonium ions are introduced into the system in form of either ammonium sulphate or ammonium phosphates with maintaining the rate of N to $P_2O_5$ in liquid phase of reactive pulp within the range of 0.01 to 0.20.

Another solution known from Polish patent description No. 101,621 is the method of preparation of ammonium phosphate and phosphoric acid of concentration 32 to 40% w/w of $P_2O_5$ then, under recited conditions exceeding by 6 to 10% $P_2O_5$ concentration used in conventional dihydrate methods. This effect is achieved by introducing ammonium ion to the liquid phase of reaction mass, thanks to the temperature of phase transition $CaSO_4.2H_2O = CaSO_4.1/2H_2O$ moves towards higher concentrations of $P_2O_5$.

The mentioned methods rely upon running the process of decomposition of phosphate material in presence of ammonium ion, so they enable use of the lower amount of sulphuric acid, up to 30% and also improve the filtrating properties of phosphate gypsum.

The drawback of these methods is the increase of the amount of undissolved phosphate material in the sediment, when the dwell time of the pulp in the reactors is within the range of 3 to 6 hours, which is the typical time used in reaction systems in conventional dihydrate methods.

That is the reason why the improved savings of the use of $H_2SO_4$ is impossible, with the regard to the increase of $P_2O_5$ contents in the form of undissolved material.

THE INVENTION

This invention concerns the method of preparation of multicomponent fertilizers, based upon the decomposition of mineral phosphate material by sulphuric acid and ammonium sulphate. The virtue of the invention lays in that the mineral phosphate material undergoes wet milling process as a result of which mechanically induced chemical processes occur and disintegrate the apatite structure of the raw material. The obtained mixture is introduced into the reactor-crystallizer systems, where further decomposition of phosphate material and crystallisation of phosphate gypsum occurs.

The reactive pulp or mass is centrifuged and phosphate gypsum after washing in counter-current is directed to processing for chalk and ammonium sulphate solution, which part is used for counter-current washing of phosphate gypsum. The washings obtained in the process are introduced to the process of obtaining fertilizer, when the remaining part of the solution in quantity of 30 to 70% of total volume of solution is introduced to the initial wet milling stage of the phosphate material.

It is also possible to introduce to the system ammonium sulphate from the waste of another technological processes like caprolactam, titanium white or acrylonitrile manufacturing.

The technical advantages of the method according to the invention rely on that the initial decomposition in the mill enables achieving considerably fuller decomposition in extraction process and that is why the contents of $P_2O_5$ in undissolved form is about fivefold lower than in known processes and reaches 0.05 to 2% w/w of $P_2O_5$ in respect to dry mass of phosphate gypsum. In effect of running two stage process significantly higher use of $P_2O_5$ contained primarily in phosphate material is achieved, even when lower-reactivity phosphate materials are taken.

Introduction of initial mechanical-chemical decomposition enables to lower significantly the use of sulphuric acid and to replace acid by ammonium sulphate, obtained in the process of phosphate gypsum conversion by ammonia and carbon dioxide which allows recovery of chalk of advantageous fertilising properties instead of burdensome the debris which is phosphate gypsum.

In this process not only regeneration of sulphate ion occurs but also the salvage of $P_2O_5$ contained in nonwashable form and in form adsorbed on the surface of phosphate gypsum. In the process of conversion these forms pass to the liquid phase which is in solution of ammonium sulphate, with which they return to the centers of the system. This effect like the further decomposition of raw material enable achievement of total efficiency of the process up to 98-99%, significantly higher than the efficiency of all known dihydrate methods. Running the process of phosphate material decomposition with its activation by way of mechanical—chemical wet milling permits dispensing of the uniform suspension to the centre of phosphate material decomposition, connected with phosphate gypsum crystallisation, thanks to which it is possible to maintain the stabile level of sulphate ion and $P_2O_5$ concentration in the liquid, reactive pulp phase, so the process of crystallisation runs with forming uniform crystals of phosphate gypsum, what enables to achieve the sediment of lower contents of $P_2O_5$ in crystalline form, built-in, ocluded and adsorbed. The sediment has good filtrating properties what enables to achieve well-washed sediment containing from 0.1 to 0.3% of $P_2O_5$ in non-washable form.

Application of the method according to the invention enables shortening of milling time by about 50%, comparing to dry milling, then it allows a decrease the the consumption of energy in this stage of the process.

In a variant of the method for preparing multicomponent NPK fertilizers, mineral phosphate material undergoes wet milling in solution of ammonium sulphate and sulphuric acid with maintaining the weight to weight ratio of ammonium sulphate to sulphuric acid at range from 0.35 to 1.2 and weight to weight ratio of phosphate material to sulphate ion from 0.9 to 1.5.

To the milled suspension, inorganic compounds containing potassium and nitrogen in amounts of 80 to 120% w/w in respect to phosphate material are introduced, yielding after granulation and drying the complex NPK fertilizer. Technical advantages resulting from application of that variant of the method according to the invention rely on the composition process of apatite structure of raw material $Ca_5F(PO_4)_3$ runs exclusively during mechanical-chemical milling operation.

In that process high contents of $P_2O_5$ in form acceptable for plants is achieved, because about 97-98% is soluble in 2% citric acid solution but about 90.0 to 91.0% in water—in case of use the substrate Florida 68 BPL. The fertilizer obtained in this way may have variable contents, as it is possible to obtain the fertilizer type 1:1:1.

The advantage of the process is moreover the elimination of phosphor gypsum production and high extent of use phosphate material because practically the whole amount of $P_2O_5$ introduced into the system is found in the fertilizer. In the milling process, lowered for about 14-20% amount of sulphate ion is applied in relation to the mass of that ion applied in the extractive method.

This method also requires extremely simplified technological line.

Then, it may be realised with low level of money expenditure.

The subject of the invention is here below explained by examples of preparation of multicomponent fertilizers in one or two-stage methods.

EXAMPLE I

Into a ball mill, 1000 kg per hour of phosphate raw material Florida 70 BPL, containing 32% w/w of $P_2O_5$ and 1594 kg per hour of ammonium sulphate solution of concentration 38% w/w are introduced. Milling runs continuously with the pulp dwell time in the mill of half an hour and with maintaining the weight ratio of milling agents to phosphate material mass equal to 3.5. The milled mixture is continuously introduced to five reactors, cascade system of crystallizers in which circulation of the pump runs together with recovering of the reaction heat by cooling in an adiabatic evaporator. To first of the reactors of the system all milled suspension is introduced with 450 kg per hour of sulphuric acid solution of 98% concentration, mixed previously with filtered liquor from phosphate gypsum, containing 4.8% of N and 32% of $P_2O_5$ in rate of 1220 kg per hour.

In this, second stage of decomposition, simultaneously crystallisation of phosphate gypsum runs. In this stage of the process the ratio of liquid phase to solid phase is maintained at the level of 2.6 and the time of the pulp dwell in the reactor reaches 5 hours, so the decomposition of phosphate material yields up to 99%. Phosphate gypsum pulp is filtered off and the liquor is returned to the decomposition stage. Washing off phosphate gypsum from the liquor is ran in two steps with the first zone of washing 1280 kg of ammonium sulphate solution of concentration 38% w/w is given and solution obtained in this way, containing 13.7% of $P_2O_5$, 9.87% N and 17.1% of $SO_4^{2-}$ in quantity of 2287 kg per hour is neutralized with gaseous ammonia in quantity of 33, 0 kg $NH_3$ per hour, then 499 kg per hour of potassium chloride is introduced, the product is granulated and dried, yielding 1660.7 kg per hour of fertilizer containing 18.9% of $P_2O_5$, 14% N and 18.9% of $K_2O$.

Phosphate gypsum after washing with ammonium sulphate solution is washed with 480 kg per hour of water and the liquor obtained in this stage, containing 10.5% of $P_2O_5$ and 14.7% $(NH_4)_2SO_4$ in quantity of 685.7 kg per hour is returned to the crystallizers system. Phosphate gypsum washed in this way in quantity of 2150 kg per hour and humidity of 21% is reprocessed for chalk by action of 338 kg per hour of carbon dioxide and 273 kg per hour of ammonia, yielding, after filtering off the chalk 2870 kg of ammonium sulphate solution of concentration 38% of $(NH_4)_2SO_4$. Part of this solution is introduced to the mill in quantity of 1554 kg per hour, but remaining amount of 1276 kg per hour—for washing the sediment of phosphate gypsum in the first zone of washing. After filtering off, washing and drying, 964 kg per hour of chalk, containing 81.8% $CaCO_3$ and 8.2% of $(NM_4)_2So_4$ is obtained.

In this example savings of 50% of sulphuric acid is achieved in comparison to other known dihydrate methods.

EXAMPLE II

To a ball mill 1000 kg per hour of mineral phosphate material is introduced, containing 31.01% w/w of $P_2O_5$ and 45.3% w/w CaO and reactive solution in quantity of 1860.9 kg per hour, containing 573.9 kg of ammonium sulphate and 426.1 kg of sulphuric acid in recount to 100% concentration. Time of stay of the mixture in the mill lasts up to about 1 hour. Under these conditions the product is obtained, containing 90.5% of $P_2O_5$ in water-soluble form in quantity of 90.5% and of 98% in citric acid (2% solution) soluble form of total amount of $P_2O_5$ contained in phosphate raw material. Obtained product of milling is enriched in nitrogen by addition of 381.2 kg per hour of urea and completing with potassium component by mixing with KCl in quantity of 476.2 kg per hour.

Obtained NPK fertilizer after drying contains 9.5% w/w of nitrogen, 9.78% w/w of $P_2O_5$ and 9.5% w/w of $K_2O$. The contents of water-soluble form of $P_2O_5$ sets up to 8.85% w/w and 2% citric acid soluble form—9.58% w/w respectively.

We claim:

1. A process for the preparation of phosphate fertilizers which comprises the steps of:
   (a) decomposition of the phosphate mineral by wet milling of said phosphate mineral simultaneously with the wetting of said mineral by sulfuric acid and ammonium sulfate solution to produce a milled suspension;
   (b) completing the decomposition of any residual phosphate by transferring said milled suspension to crystallizing vessels;
   (c) crystallizing the phosphate fertilizer in said vessels;
   (d) filtering the precipitated gypsum and residual pulp from the ammonium sulfate solution;
   (e) washing said precipitate in counter current fashion with a portion of the ammonium sulfate filtrate;
   (f) utilizing the remaining portion of the ammonium sulfate solution for preparing the phosphate fertilizer;
   (g) recycling the ammonium sulfate solution to said wet milling decomposition step (a).

2. The process according to claim 1 wherein the initial source of the ammonium sulfate for the wet milling is a waste by-product from some other process.

3. The process according to claim 1 based upon the multi-component phosphate fertilizers prepared by the decomposition of phosphate materials during wet milling in the presence of sulfuric acid and ammonium sulfate; wherein said phosphate material is wet milled in an ammonium sulfate and sulfuric acid mixture maintained at a sulfate to acid weight ratio within the range 0.35 to 1.2 and the weight ratio of phosphate material to sulfate ion of 0.9 to 1.5; said milled suspension having nitrogen and potassium added in amounts of 88 to 120% w/w in relation to said phosphate material and granulating and drying the crystallized resulting complex NPK-type fertilizer.

* * * * *